UNITED STATES PATENT OFFICE.

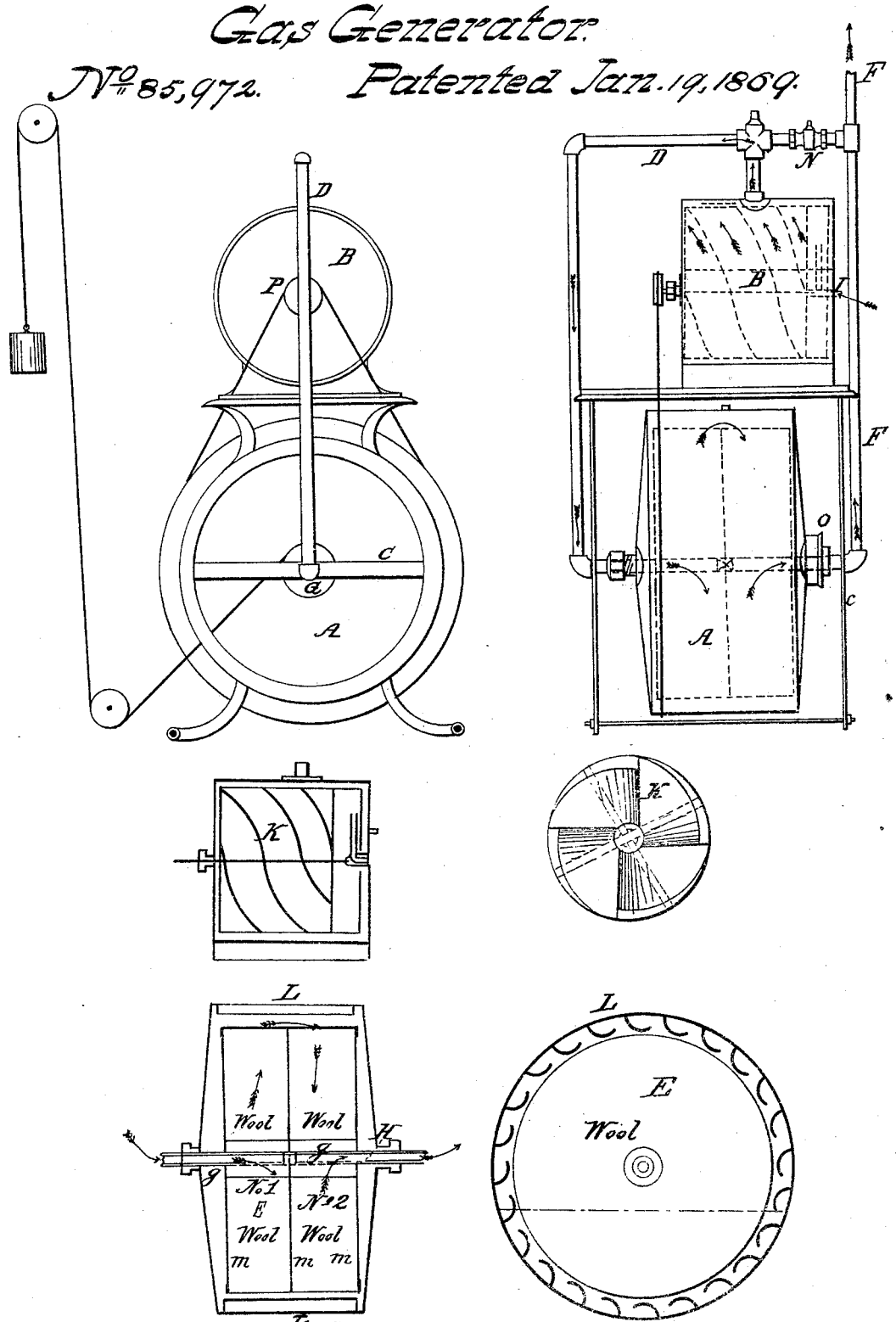

JOHN H. STEINER, OF KANSAS CITY, MISSOURI.

IMPROVED GAS-GENERATOR.

Specification forming part of Letters Patent No. 85,972, dated January 19, 1869.

*To all whom it may concern:*

Be it known that I, JOHN H. STEINER, of Kansas City, county of Jackson, State of Missouri, have invented a new and Improved Automatic Gas-Generator for illuminating purposes; and I do hereby declare that the following is a full and exact description.

The nature of my invention consists in forcing atmospheric air by means of a blower through a cylinder packed with wool containing gasoline, thereby impregnating the atmospheric air while passing through said cylinder with hydrocarbon.

To enable others skilled in the art to make and use my invention, I will proceed to describe its construction and operation.

My invention consists of the cylinder A, as shown in the drawing, which contains the gasoline, and B, which is a blower forcing the air through the pipe D into the evaporator E, which is stationary on a hollow shaft, G, passing through the cylinder A. The evaporator E is composed of a number of circular plates fastened on the hollow shaft G.

The chambers formed by these plates around the shaft G are packed with wool having a flannel cloth drawn over its outer surface to contain the wool. The hollow shaft G is perforated on the under side, and a stop placed in the center, thus compelling the atmosphere to pass out of shaft G into evaporating-chamber No. 1, then passing through the flannel covering into the cylinder A, and from thence into chamber No. 2; then into the hollow shaft G again, on the opposite side of the stop in the center of the shaft G.

The cylinder A is provided with a number of troughs or elevators L, which carry the gasoline up over evaporator E, distributing it over its surface, then passing down through the evaporator E to the lower side of cylinder A. By this means the wool is kept continually saturated with gasoline while the machine is in motion. Letter O is a drum, fastened on the outside of cylinder A, (shown in the drawing,) which receives a cord and weight to give motion to the machine. Cylinder A forms the driver to operate blower B. F is the outlet-pipe, fastened on the hollow shaft G, and D is the inlet-pipe, fastened on the shaft G, opposite to the outlet-pipe F. N is a stop-cock, with connections to admit atmospheric air into pipe F, to dilute the gas when too rich. The blower consists of a screw placed into a cylinder which is two-thirds filled with water. The screw K is revolved on cylinder B by means of a belt and pulley, P, driven by cylinder A, as shown in the drawings.

What I claim as my invention, and desire to secure by Letters Patent, is—

1. A revolving cylinder around a hollow shaft, as shown by the drawings, provided with a series of elevators fastened to its inner circumference.

2. A stationary hollow shaft, with a stop placed in the center of said shaft perforated on the lower side.

2. The plates fastened to the hollow shaft G that forms the evaporator E.

4. The stationary evaporator, when constructed as shown in the drawings.

5. The drum O, in combination with the cylinder A.

6. The screw-shaped blades in the cylinder K, as also shown in the drawings.

JOHN H. STEINER.

Witnesses:
   GEO. HAYDEN,
   C. H. VINCENT.